US012700995B2

(12) United States Patent
Kwon et al.

(10) Patent No.: US 12,700,995 B2
(45) Date of Patent: Aug. 4, 2026

(54) MULTI-USER QUANTUM KEY DISTRIBUTION APPARATUS

(71) Applicant: ELECTRONICS AND TELECOMMUNICATIONS RESEARCH INSTITUTE, Daejeon (KR)

(72) Inventors: O-Sung Kwon, Daejeon (KR); Jin-Gak Jang, Daejeon (KR); Haeng-Seok Ko, Daejeon (KR); Dae-Sung Kwon, Daejeon (KR); Youn-Chang Jeong, Daejeon (KR); Se-Wan Ji, Daejeon (KR); Seok Kim, Daejeon (KR); Chang-Ho Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 314 days.

(21) Appl. No.: 18/378,295

(22) Filed: Oct. 10, 2023

(65) Prior Publication Data

US 2024/0421985 A1 Dec. 19, 2024

(30) Foreign Application Priority Data

Jun. 16, 2023 (KR) ........................ 10-2023-0077195

(51) Int. Cl.
H04L 9/08 (2006.01)
(52) U.S. Cl.
CPC .................................. H04L 9/0852 (2013.01)

(58) Field of Classification Search
CPC ... H04L 9/0852; H04L 9/0861; H04B 10/508; H04J 14/0307; H04Q 11/0067; H04Q 2011/0016
See application file for complete search history.

(56) References Cited

U.S. PATENT DOCUMENTS

| | | | |
|---|---|---|---|
| 7,826,749 B2 | 11/2010 | Luo et al. | |
| 11,070,370 B2 | 7/2021 | Guo et al. | |
| 12,200,115 B2 * | 1/2025 | Lord ...................... | H04L 9/0852 |
| 2007/0065154 A1 * | 3/2007 | Luo ........................ | H04L 9/0852 |
| | | | 398/141 |
| 2019/0312723 A1 * | 10/2019 | Guo ...................... | H04L 9/0858 |
| 2022/0173895 A1 * | 6/2022 | Lord ........................ | H04L 9/08 |

FOREIGN PATENT DOCUMENTS

| | | |
|---|---|---|
| KR | 10-2008-0045220 A | 5/2008 |
| KR | 10-2016-0146305 A | 12/2016 |
| KR | 10-2019-0053837 A | 5/2019 |

OTHER PUBLICATIONS

Bernd Frohich et al., "A quantum access network", Nature, Sep. 4, 2013.

* cited by examiner

*Primary Examiner* — Baotran N To
(74) *Attorney, Agent, or Firm* — LRK PATENT LAW FIRM

(57) ABSTRACT

Disclosed herein is a quantum key distribution apparatus. The quantum key distribution apparatus includes an optical pulse in which information for private key generation is included is transmitted to multiple receivers, respectively, through different communication paths, and the optical pulse is generated at a speed higher than an optical pulse measurement speed of each of the multiple receivers by a multiple of a number of multiple receivers.

11 Claims, 6 Drawing Sheets

MULTI-USER QUANTUM KEY DISTRIBUTION APPARATUS

CROSS REFERENCE TO RELATED APPLICATION

This application claims the benefit of Korean Patent Application No. 10-2023-0077195, filed Jun. 16, 2023, which is hereby incorporated by reference in its entirety into this application.

BACKGROUND OF THE INVENTION

1. Technical Field

The following embodiments relate to multi-user quantum communication technology based on quantum key distribution.

2. Description of Related Art

Quantum Key Distribution (QKD) technology is technology for distributing a private key, which guarantees unconditional security based on the principle of quantum mechanics, that is, uncertainty and the impossibility of replication. By utilizing this technology, quantum cryptography technology that is capable of securely transmitting pieces of sensitive data may be developed.

Such QKD technology has a structure in which a transmitter and a receiver have one-to-one correspondence. The reason for this is that a single photon is used as a basic transfer medium, thus making it impossible to share information with multiple receivers.

As the most representative protocol, there is BB84 protocol proposed by Charles Bennett and Gilles Brassard in 1984. The operating principle of polarization-based BB84 protocol is described below. In the protocol, four polarization states forming two bases, that is, vertical (90°), horizontal (0°), 45°, and −45° polarization states are used to input information to single light.

A transmitter (hereinafter referred to as 'Alice') selects an arbitrary basis state, randomly selects one of the two polarization states of the selected basis, inputs the selected polarization state to light, and thereafter transmits the light with the selected polarization state to a receiver (hereinafter referred to as 'Bob'). Bob measures and records the polarization state of the photon that reaches Bob using the arbitrary basis state. When communication between two users is completed, Alice and Bob disclose their bases and generate a private key (secret key) based on the polarization states of the optical signals in the case where the bases are identical to each other.

In this way, the technical development of QKD is connected to the development of quantum cryptography communication using quantum key distribution. In modern times, there is a need to implement multi-user (or multiparty) QKD, rather than one-to-one communication, based on QKD technology.

However, in conventional technology, the efficiency of a system for generating a private key is decreased in proportion to the number of receiving ends. Further, because the characteristics of respective receiving ends (Bobs) are different from each other, security issues of QKD may arise. That is, conventional technologies in which multiple users constitute a network based on a quantum key distribution system are disadvantageous in that, as the number of receivers increases, the generation efficiency is deteriorated.

SUMMARY OF THE INVENTION

An embodiment is intended to provide a multi-user quantum key distribution (QKD), rather than one-to-one communication, based on QKD.

An embodiment is intended to provide a quantum key distribution apparatus, which prevents private key generation efficiency from being deteriorated even though the number of receivers increases.

In accordance with an aspect, there is provided a quantum key distribution apparatus, wherein an optical pulse in which information for private key generation is included is transmitted to multiple receivers, respectively, through different communication paths, and the optical pulse is generated at a speed higher than an optical pulse measurement speed of each of the multiple receivers by a multiple of a number of multiple receivers.

The quantum key distribution apparatus may include a light source configured to generate and output an optical pulse having a single photon, an encoder configured to encode private key information into the optical pulse generated by the light source, an optical splitter configured to divide and output optical pulses in which the private key information is encoded into communication paths corresponding to a number of multiple receivers, and multiple switches configured to turn on/off the communication paths connected to the multiple receivers, respectively.

The encoder may encode different pieces of private key information into respective optical pulses.

The multiple switches may be turned on at intervals of periods corresponding to optical pulse measurement speeds of the multiple receivers.

In accordance with another aspect, there is provided a quantum key distribution apparatus, wherein an optical pulse in which information for private key generation is included is transmitted to multiple receivers, respectively, through a single communication path, and the optical pulse is separated into optical pulses for respective wavelengths, and the optical pulses for respective wavelengths are simultaneously transmitted to the multiple receivers.

The quantum key distribution apparatus may include a light source configured to generate and output an optical pulse having a single photon, an encoder configured to encode private key information into the optical pulse generated by the light source, and a wavelength division multiplexing unit configured to separate the optical pulse into optical pulses for respective wavelengths and transmit the optical pulses for respective wavelengths to the multiple receivers.

The encoder may encode different pieces of private key information for respective wavelengths of the optical pulse.

In accordance with a further aspect, there is provided a quantum key distribution apparatus, wherein an optical pulse in which information for private key generation is included is transmitted to each of K (N×M) receivers through M different communication paths, and the optical pulse is generated at a speed that is M times higher than an optical pulse measurement speed of each of multiple receivers while the optical pulse is separated into optical pulses for N respective wavelengths and the optical pulses for N respective wavelengths are simultaneously transmitted to the N receivers.

The quantum key distribution apparatus may include a light source configured to generate and output an optical pulse having a single photon, an encoder configured to encode private key information in the optical pulse generated by the light source, an optical splitter configured to divide and output optical pulses in which the private key information is encoded into M communication paths, M switches configured to turn on/off the M communication paths, and a wavelength division multiplexing unit configured to separate each of optical pulses, output from the M switches, respectively, into optical pulses for respective wavelengths and output the optical pulses for respective wavelengths to the N receivers.

The encoder may encode different pieces of private key information for respective wavelengths of the optical pulse.

Each of the switches may be turned on at intervals of a period corresponding to an optical pulse measurement speed of each of the multiple receivers.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
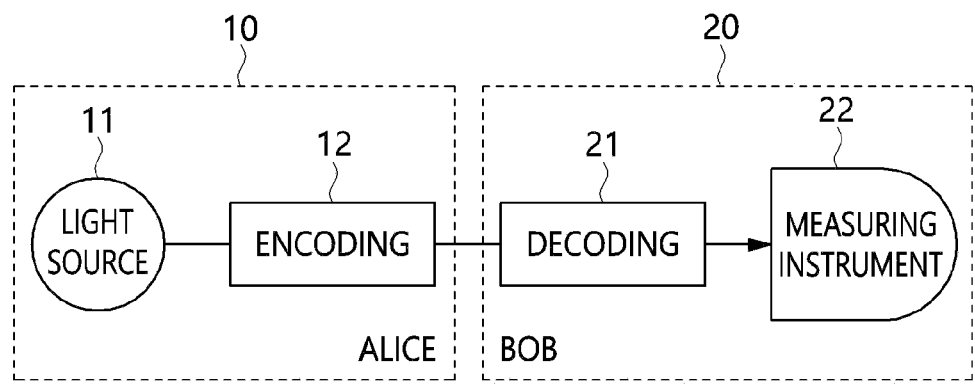
FIG. 1 is a configuration diagram of a typical quantum key distribution system.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Figure 2:
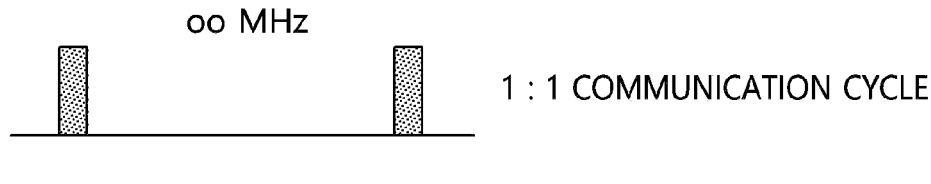
FIG. 2 is a diagram illustrating an example of a communication cycle between a transmitter and a receiver in a typical quantum key distribution system.

FIG. 1 is a configuration diagram of a typical quantum key distribution system, and FIG. 2 is a diagram illustrating an example of a communication cycle between a transmitter and a receiver in a typical quantum key distribution system.

Referring to FIG. 1, a transmitter (Alice) 10 generates an optical pulse at a single photon level through a light source 11, encodes (12) information for private key generation into the optical pulse, and then transmits the optical pulse to a receiver (Bob) 20.

Then, after the receiver (Bob) 20 decodes (21) the received optical pulse, the receiver (Bob) 20 measures the state of the optical pulse through a measuring instrument 22.

Thereafter, the information transmitted from the transmitter (Alice) 10 is compared with the result measured by the receiver (Bob) 20, whereby a private key is shared between the transmitter and the receiver.

In this case, when one-to-one communication is performed between the transmitter (Alice) 10 and the receiver (Bob) 20, the light source 11 of the transmitter (Alice) 10 transmits the optical pulse at intervals of a certain cycle, and the receiver (Bob) 20 measures the optical pulse received at intervals of the certain cycle identical to that of the transmitter (Alice) 10 through the measuring instrument 22, as illustrated in FIG. 2.

However, because the operating speed of the measuring instrument 22 is limited compared to the light source 11, the communication speed between the transmitter (Alice) 10 and the receiver (Bob) 20 is defined based on the operating speed of the measuring instrument 22.

However, in modern times, there is a need to implement multi-user QKD rather than one-to-one communication based on QKD technology.

In order to meet such a necessity, various multi-user quantum key distribution network structures have been proposed.

First, "Field test of quantum key distribution in the Tokyo QKD Network (Optical Express Vol. 19 pp. 10387)" discloses a Tokyo QKD network in operation. Here, different QKD apparatuses may be installed in respective sections, and communication with a desired target may be performed using the results of QKD.

However, because such QKD technology generates only one key at one time, the entire system may be used by only one user at one time. When the number of receivers increases, additional QKD apparatuses need to be installed, thus not only increasing installation cost but also needing more space and cost required for storage and management of the apparatuses. Further, when different types of QKD apparatuses are used, efforts to adjust respective protocols to each other are required.

Next, in technology entitled "method and System for Quantum Key Distribution over Multi-user WDM Network with Wavelength Routing (Korean Patent Application Publication No. 10-2008-7006610)", one transmitter may perform quantum key distribution with multiple receivers through wavelength separation of a light source. That is, the transmitter selects a receiver with which communication is to be performed, and transmits/receives a quantum signal to/from the selected receiver at the same reception wavelength as the selected receiver over a Wavelength Division Multiplexing (WDM) network. The WDM network allows a quantum signal to be communicated via wavelength routing between the transmitter and the receiver.

However, the WDM network has limitation in communication with multiple users because communication with only one user is possible at one time.

Further, in technology entitled "Method and Apparatus for Distributing Common Key to Multiple Quantum Communication Clients (Korean Patent Application Publication No. 10-2015-0083401)", a transmitter generates an arbitrary signal and distributes the arbitrary signal to multiple receivers. Respective receivers measure signals transmitted from the transmitter, and transmit the results of measurement to the transmitter. Because the multiple receivers need to have a common key, the transmitter determines pieces of information to be taken by respective receivers and retransmits the pieces of information to the receivers. Based on the retransmitted information, respective multiple receivers have the same common key with the transmitter.

However, in this case, a generation rate for the common key may be deteriorated as the number of receivers increases. Furthermore, even though only information about one user is leaked, the entire system may be exposed to a risk. Also, when a receiver having decreased efficiency appears during a process of distributing the common key to respective receivers, the common key generation rate of the entire system may decrease.

Furthermore, technology entitled "Phase Polarization Multi-Degree-of-Freedom Modulation QKD Network System and Method (Korean Patent Application Publication No. 10-2019-7002931)" discloses a phase polarization multi-degree-of-freedom modulation QKD network system, wherein Alice transmitting end generates a pulse train having multiple wavelengths, the pulse train is attenuated to a single photon level pulse through an attenuator, the single photon pulse is separated into a vertically polarized pulse and a horizontally polarized pulse by a first polarizing beam splitter. Subsequently, the vertically polarized pulse and the horizontally polarized pulse pass through an upper arm path and a lower arm path, respectively, and enter a first beam combiner to be combined with each other. Then, the combined polarized pulse is randomly phase-modulated by a phase modulator with a random phase kök=0,1). The phase-modulated signal individually reaches a first polarization controller and a second polarization controller, where pulse polarization rotation is performed, and finally, both pulses enter a multi-user Bob end in the same polarization state. When the multi-wavelength laser pulses having the same polarization are transmitted to a wavelength router device, a Bob end having the corresponding wavelength is selected using an address designation scheme depending on the wavelength, polarized demodulation is performed by a second polarizing beam splitter in a unit Bob end. When a polarizing bit is "0", the horizontally polarized pulse is selected to pass through a third polarization controller, whereas when a polarizing bit is "1", the vertically polarized pulse is selected to pass through a fourth polarization controller. After a pulse is output from the third polarization controller and passes through a third polarizing beam splitter, the two paths, that is, the upper arm path and the lower arm path are formed, wherein the upper arm path is a path through which a prepulse reaches a second beam combiner after a certain delay time, and the lower arm path is a path through an afterpulse immediately reaches the second beam combiner. The two light beams in the upper arm path and the lower arm path cause interference in the second beam combiner, and a first photon detector and a second photon detector identifiably respond to the light beams based on the randomly modulated phase difference. After a pulse is output from the fourth polarization controller and passes through a fourth polarizing beam splitter, two paths, that is, an upper arm path and a lower arm path are formed, wherein the upper arm path is a path through which the prepulse reaches a third beam combiner after a certain delay time, and the lower arm path is a path through which the afterpulse immediately reaches the third beam combiner. The two light beams in the upper arm path and the lower arm path cause interference in the third beam combiner, and a third photon detector and a fourth photon detector identifiably respond to the light beams based on the randomly modulated phase difference.

However, as the number of Bobs increases, efficiency is deteriorated, and the network system's own loss rate also increases due to a complicated optical system.

Finally, in technology entitled "A quantum access network (Nature Vol. 501 pp. 69 (2013))", multiple transmitters transmit optical signals to one receiver at preset times. The receiver analyzes signals received at respective times, selects corresponding transmitters, and generates a common key.

However, this technology is disadvantageous in that the number of transmitters is limited due to the technical restriction of the receiver, and the key generation rate of the system is also influenced by the number of transmitters.

That is, as described above, in conventional technology, the efficiency of a system for generating a private key is decreased in proportion to the number of receiving ends (receivers). Further, because the characteristics of respective receiving ends (Bobs) are different from each other, security issues of QKD may arise. That is, conventional technologies in which multiple users constitute a network based on a quantum key distribution system are disadvantageous in that, as the number of receivers increases, the generation efficiency is deteriorated.

Figure 3:
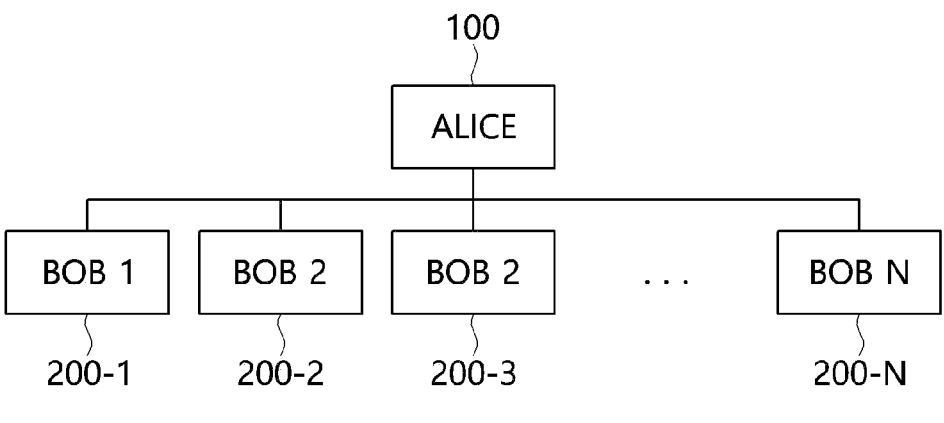
FIG. 3 is a schematic configuration diagram of a multi-user quantum key distribution system according to an embodiment.

FIG. 3 is a schematic configuration diagram of a multi-user quantum key distribution system according to an embodiment.

Referring to FIG. 3, in the multi-user quantum key distribution system according to an embodiment, one transmitter (Alice) 100 may simultaneously perform quantum key distribution (QKD) with multiple receivers (Bob 1, Bob 2, Bob 3, . . . , Bob N) 200-1, 200-2, 200-3, . . . , 200-N.

Basically, the purpose of quantum key distribution (QKD) is to securely share a private key between two users.

Figure 4:
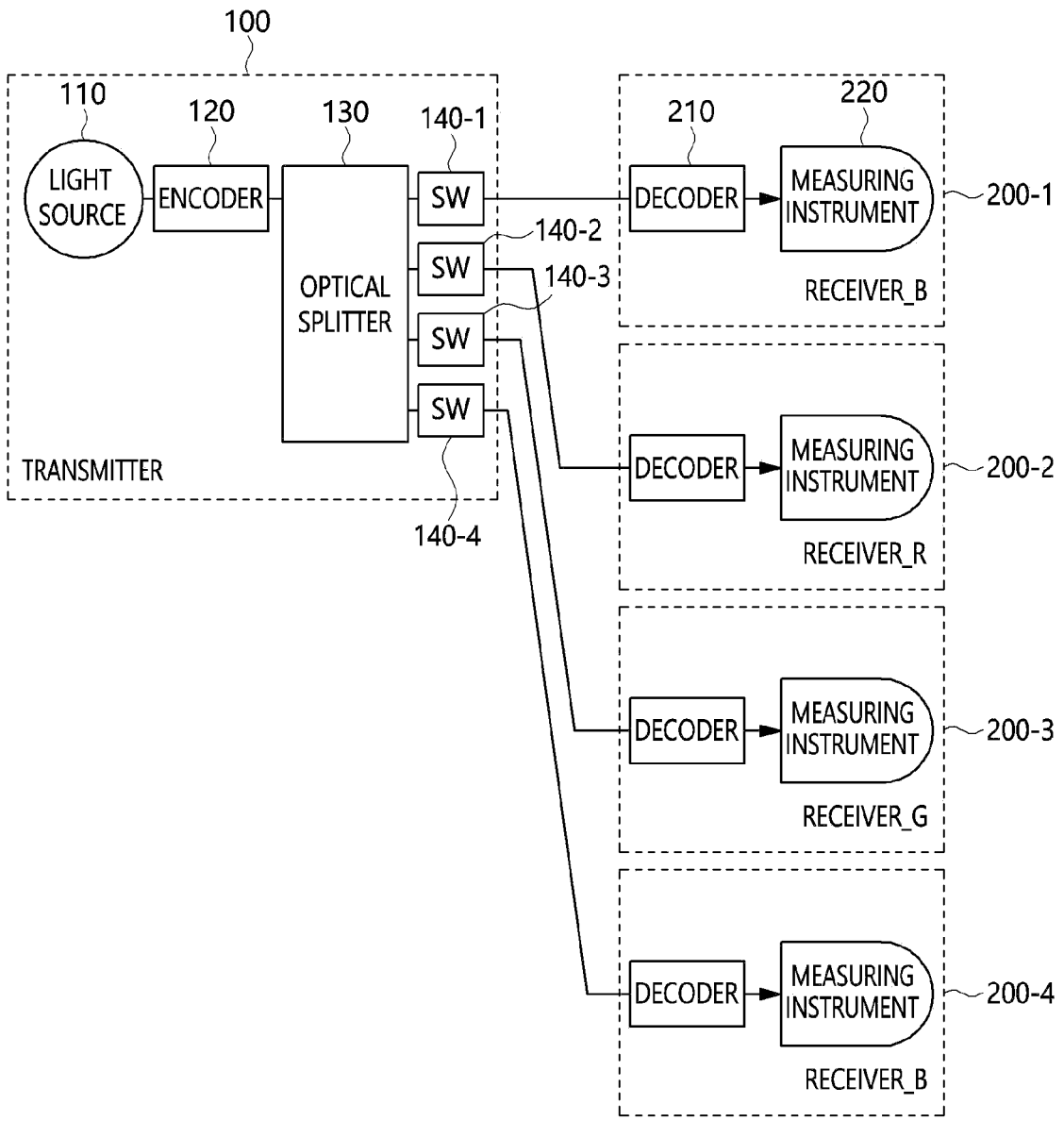
FIG. 4 is a block diagram illustrating the detailed configuration of a multi-user quantum key distribution system according to an embodiment.
Figure 5:
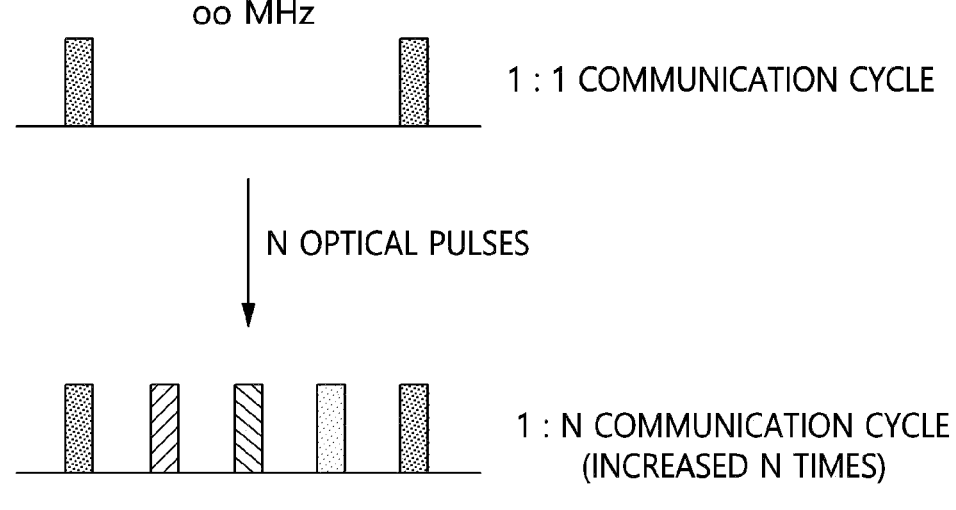
FIG. 5 is a diagram illustrating an example of a communication cycle between a transmitter and a receiver in a multi-user quantum key distribution system according to an embodiment.

FIG. 4 is a block diagram illustrating the detailed configuration of a multi-user quantum key distribution system according to an embodiment, and FIG. 5 is a diagram illustrating an example of a communication cycle between a transmitter and a receiver in a multi-user quantum key distribution system according to an embodiment. Here, although the case where four receivers 200-1, 200-2, 200-3, and 200-4 are present is described by way of example for convenience of description, the present disclosure is not limited thereto.

Referring to FIG. 4, the transmitter 100 according to an embodiment transmits optical pulses, each including information for private key generation, to multiple receivers 200-1, 200-2, 200-3, and 200-4, respectively, through different communication paths.

For this operation, the transmitter 100 according to the embodiment may include a light source 110, an encoder 120, an optical splitter 130, and multiple switches 140-1, 140-2, 140-3, and 140-4.

The light source 110 generates and outputs an optical pulse having a single photon. Here, in accordance with an embodiment, the transmitter 100 needs to transmit optical pulses in conformity with the operating speeds of measuring instruments 220 included in the multiple receivers 200-1, 200-2, 200-3, and 200-4, respectively.

That is, while each of the multiple receivers 200-1, 200-2, 200-3, and 200-4 receives an optical pulse once, the transmitter 100 needs to generate a number of optical pulses identical to the number of multiple receivers 200-1, 200-2, 200-3, and 200-4.

Therefore, as illustrated in FIG. 5, the light source 110 needs to generate optical pulses at speed corresponding to a multiple of the number of the multiple receivers 200-1, 200-2, 200-3, and 200-4 compared to the case where the light source 110 communicates with one receiver in a one-to-one communication manner. For example, when N is 4 and the measuring instrument 220 of the receiver is operated at an operating speed of 10 MHZ, each optical pulse may be driven at a frequency of 40 MHz.

The encoder 120 encodes private key information into the optical pulses generated by the light source 110.

Therefore, the optical pulses, the operating speed of each of which is increased N times, have pieces of independent encoding information. For example, when N is 4 and the measuring instrument 220 of the receiver is operated at an operating speed of 10 MHz, respective pieces of encoding information are recorded in the optical pulses at a frequency of 40 MHz.

This is essentially required in order to solve security threats that may occur in the construction of a QKD network. That is, the reason for this is to prevent other sections from being influenced by a threat even through the security of a measurement section is exposed to the threat.

In other words, this is similar to the implementation of independent QKD between the transmitter 100 and each of the multiple receivers 200-1, 200-2, 200-3, and 200-4. Therefore, unlike conventional technologies, each section has a generation rate identical to that when one-to-one QKD is implemented.

The optical splitter 130 outputs the optical pulses in which the private key information is encoded by dividing the output pulses by the number of multiple receivers 200-1, 200-2, 200-3, and 200-4. That is, the optical splitter 130 divides and outputs the generated optical pulses into N paths.

The multiple switches 140-1, 140-2, 140-3, and 140-4 turn on/off communication paths connected to the multiple receivers 200-1, 200-2, 200-3, and 200-4, respectively, at intervals of a preset period. Therefore, the optical pulses, in which private key information is encoded and which are output from the optical splitter 130, may be transmitted to the multiple receivers 200-1, 200-2, 200-3, and 200-4, respectively, through corresponding communication paths as the switches are turned on.

Here, the multiple switches 140-1, 140-2, 140-3, and 140-4 may be turned on at intervals of periods corresponding to the respective optical pulse measurement speeds of the multiple receivers.

Meanwhile, each of the multiple receivers 200-1, 200-2, 200-3, and 200-4 may include a decoder 210 and a measuring instrument 220.

The decoder 210 decodes the corresponding optical pulse transmitted from the transmitter 100.

The measuring instrument 220 measures the state of the optical pulse output from the decoder 210. Here, the operating state of the measuring instrument 220 may be 1/N (where N is the number of multiple receivers) of the optical pulse generation speed of the light source 110.

As described above, in accordance with an embodiment, the transmitter 100 may perform secure QKD with the multiple receivers 200-1, 200-2, 200-3, and 200-4, and may construct a multi-user QKD network.

Figure 6:
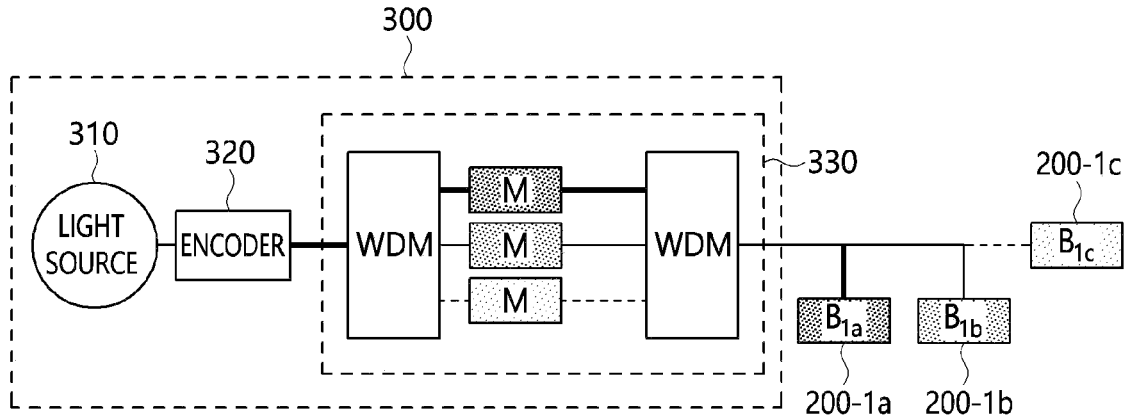
FIG. 6 is a block diagram illustrating the detailed configuration of a multi-user quantum key distribution system according to another embodiment.

FIG. 6 is a block diagram illustrating the detailed configuration of a multi-user quantum key distribution system according to another embodiment. Although the case where three receivers 200-1a, 200-1b, and 200-1c are present is described by way of example for convenience of description, the present disclosure is not limited thereto.

Referring to FIG. 6, a quantum key distribution apparatus 300 according to another embodiment may transmit an optical pulse in which information for private key generation is included to each of multiple receivers 200-1a, 200-1b, and 200-1c through a single communication path.

Here, the optical pulse may be separated into optical pulses for respective wavelengths and the optical pulses for respective wavelengths may be simultaneously transmitted to the multiple receivers 200-1a, 200-1b, and 200-1c.

Generally, although only one receiver is present on one transmission path, the optical pulse may actually have various wavelengths.

Therefore, as illustrated in FIG. 6, the optical pulse is separated into respective wavelengths by a wavelength division multiplexing unit 330 and the optical pulses for respective wavelengths are simultaneously transmitted to the multiple receivers 200-1, 200-2, ..., 200-N, whereby the number of receivers with which communication is possible through one communication path may be extended.

That is, a first wavelength may be transmitted to the first receiver 200-1a, a second wavelength may be transmitted to the second receiver 200-1b, and a third wavelength may be transmitted to the third receiver 200-1c.

Here, each of the multiple receivers 200-1a, 200-1b, and 200-1c may have a configuration including a decoder 210 and a measuring instrument 220 in the same manner as that illustrated in FIG. 4.

Here, the quantum key distribution apparatus 300 according to another embodiment may include a light source 310, an encoder 320, and a wavelength division multiplexing (WDM) unit 330.

The light source 310 generates and outputs an optical pulse having a single photon. Here, in accordance with an embodiment, the transmitter 300 needs to transmit the optical pulse at intervals of the same period as the operating speed of the measuring instrument 220 included in each of the multiple receivers 200-1a, 200-1b, and 200-1c.

The encoder 320 encodes private key information into the optical pulses generated by the light source 310.

Here, the encoder 320 may encode different pieces of private key information for respective wavelengths of the optical pulse.

The wavelength division multiplexing unit 330 may separate the optical pulse into respective wavelengths, and may transmit optical pulses corresponding to respective wavelengths to the multiple receivers 200-1a, 200-1b, and 200-1c.

Figure 7:
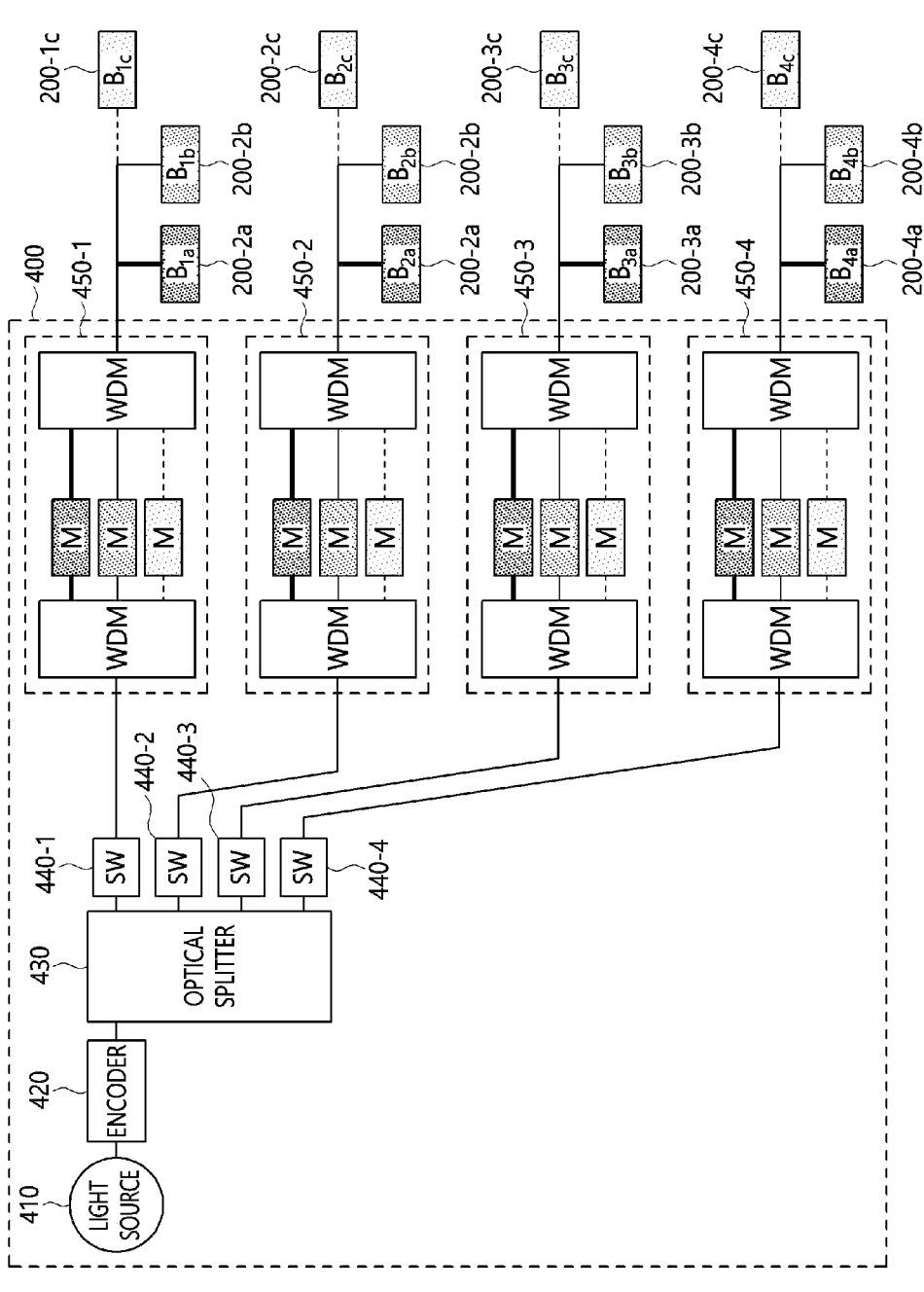
FIG. 7 is a block diagram illustrating the detailed configuration of a multi-user quantum key distribution system according to a further embodiment.

FIG. 7 is a block diagram illustrating the detailed configuration of a multi-user quantum key distribution system according to a further embodiment.

Referring to FIG. 7, a transmitter 400 according to a further embodiment may transmit optical pulses, each including information for private key generation, to K (N×M) receivers, respectively, through M different communication paths. Here, although the case where M is 4 and N is 3 is described by way of example for convenience of description, the present disclosure is not limited thereto.

Here, the transmitter 400 according to the further embodiment may include a light source 410, an encoder 420, an optical splitter 430, multiple switches 440-1, 440-2, 440-3, and 440-4, and wavelength division multiplexing (WDM) units 450-1, 450-2, 450-3, and 450-4.

The encoder 420 encodes private key information into the optical pulses generated by the light source 410.

The light source 410 generates and outputs an optical pulse having a single photon. Here, in accordance with the further embodiment, the transmitter 400 generates optical pulses at speed that is four times higher than the optical pulse measurement speed of each of multiple receivers 200-1a, 200-1b, 200-1c, 200-2a, 200-2b, 200-2c, 200-3a, 200-3b, 200-3c, 200-4a, 200-4b, and 200-4c while the optical pulses are separated into optical pulses for three wavelengths for each communication path, and the separated optical pulses may be simultaneously transmitted to three receivers, respectively.

Here, the encoder 420 may encode different pieces of private key information for respective wavelengths of the optical pulse.

The optical splitter 430 splits the optical pulse in which private key information is encoded to four communication paths, and outputs the split optical pulses through the four communication paths.

The multiple switches 440-1, 440-2, 440-3, and 440-4 turn on/off four communication paths, respectively.

The multiple switches 440-1, 440-2, 440-3, and 440-4 may be turned on at intervals of periods corresponding to the respective optical pulse measurement speeds of the multiple receivers 200-1a, 200-1b, 200-1c, 200-2a, 200-2b, 200-2c, 200-3a, 200-3b, 200-3c, 200-4a, 200-4b, and 200-4c.

The wavelength division multiplexing units 450-1, 450-2, 450-3, and 450-4 may separate each of optical pulses, output from four switches, into optical signals for respective wavelengths, and may transmit the optical pulses for respective wavelengths to three receivers for each communication path.

Figure 8:
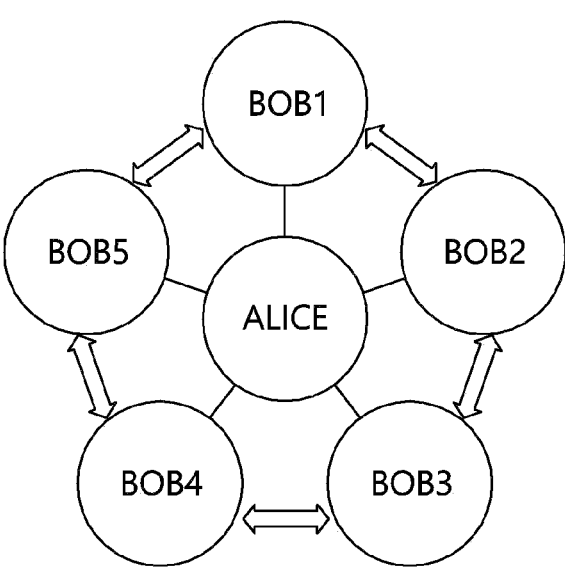
FIG. 8 is a configuration diagram of a multi-user quantum key distribution system according to yet another embodiment.

FIG. 8 is a configuration diagram of a multi-user quantum key distribution system according to yet another embodiment.

In the multi-user quantum key distribution system, described above with reference to FIGS. 3 to 7, communication cannot be performed among the multiple receivers. However, because the transmitter has information of all receivers, it may authenticate two receivers.

Therefore, in accordance with yet another embodiment, the transmitter (Alice) mutually authenticates multiple receivers, thus enabling QKD-based quantum cryptography communication among the multiple receivers. As a result, a QKD network among the multiple users may be constructed.

Figure 9:
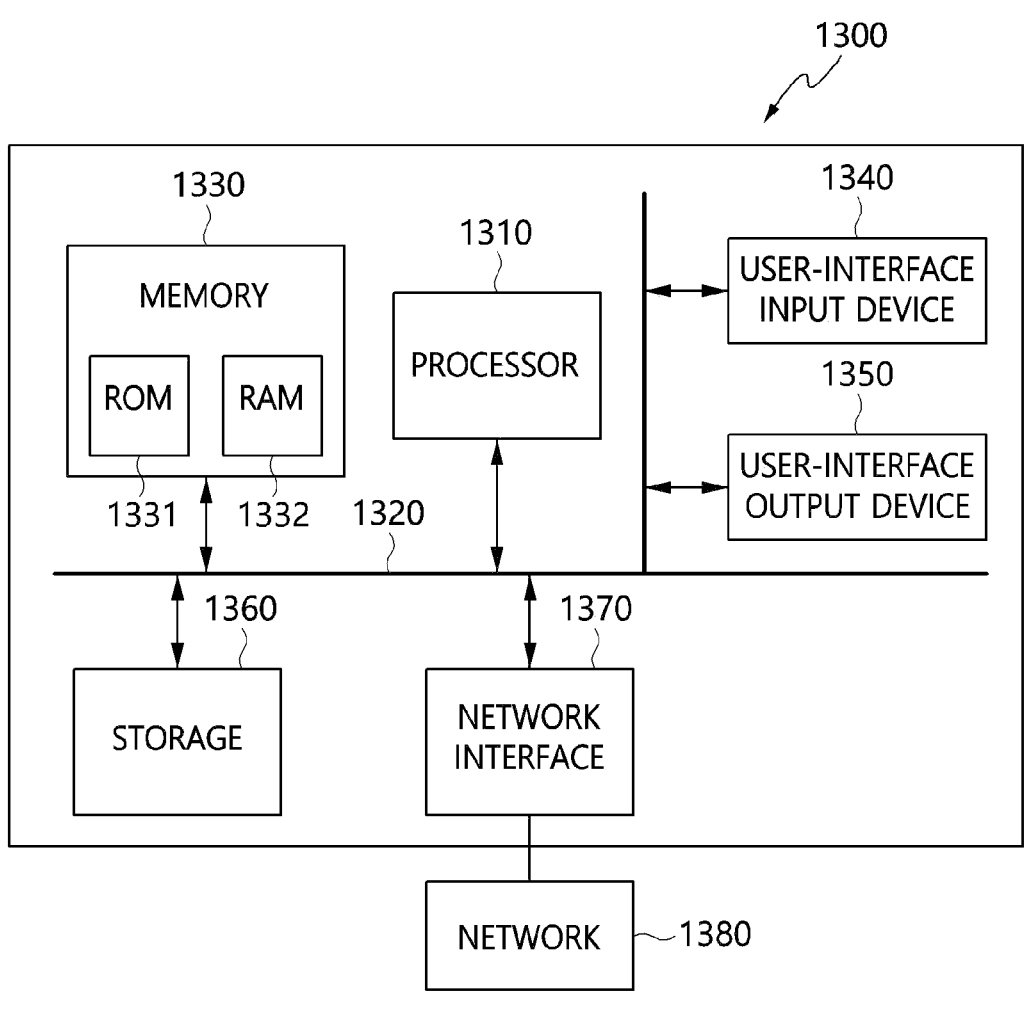
FIG. 9 is a diagram illustrating the configuration of a computer system according to an embodiment.

FIG. 9 is a diagram illustrating the configuration of a computer system according to an embodiment.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

According to an embodiment, there can be provided a quantum key distribution network apparatus and method, which can explosively increase the number of receivers while preventing private key generation efficiency from being deteriorated.

According to an embodiment, a transmitter may have a common key with multiple receivers at any time, and the number of receivers may also locally increase, thus making it very convenient for urban deployment.

Therefore, the above embodiments are advantageous in that it is suitable to install a quantum network in an actual optical communication network, and a currently constructed system may be immediately utilized without requiring a great modification.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. A quantum key distribution apparatus, comprising:
    a light source that generates and outputs an optical pulse having a single photon,
    wherein the quantum key distribution apparatus is configured such that:
    the optical pulse in which information for private key generation is included is transmitted to multiple receivers, respectively, through different communication paths, and
    the light source generates the optical pulse at a speed higher than an optical pulse measurement speed of each of the multiple receivers by a multiple of a number of multiple receivers.

2. The quantum key distribution apparatus of claim 1, further comprising:
    an encoder that encodes private key information into the optical pulse generated by the light source;
    an optical splitter that divides and outputs optical pulses in which the private key information is encoded into communication paths corresponding to the number of multiple receivers; and
    multiple switches that turns on/off the communication paths connected to the multiple receivers, respectively.

3. The quantum key distribution apparatus of claim 2, wherein the encoder encodes different pieces of private key information into respective optical pulses.

4. The quantum key distribution apparatus of claim 2, wherein the multiple switches are turned on at intervals of periods corresponding to optical pulse measurement speeds of the multiple receivers.

5. A quantum key distribution apparatus, comprising:
a light source that generates and outputs an optical pulse having a single photon, wherein the optical pulse includes information for private key generation; and
a wavelength division multiplexing unit that separates the optical pulse into optical pulses for respective wavelengths and simultaneously transmits the optical pulses for respective wavelengths to multiple receivers through a single communication path,
wherein the light source generates the optical pulse at a speed higher than an optical pulse measurement speed of each of the multiple receivers.

6. The quantum key distribution apparatus of claim 5, further comprising:
an encoder that encodes private key information into the optical pulse generated by the light source.

7. The quantum key distribution apparatus of claim 6, wherein the encoder encodes different pieces of private key information for respective wavelengths of the optical pulse.

8. A quantum key distribution apparatus, comprising:
a light source that generates and outputs an optical pulse having a single photon, wherein the optical pulse includes information for private key generation;

an optical splitter that divides the optical pulse into M communication paths, M being a positive integer greater than 1; and
M wavelength division multiplexing units that separate the optical pulse in each communication path into optical pulses for N respective wavelengths and simultaneously transmit the optical pulses for respective wavelengths to N receivers, N being a positive integer greater than 1,
wherein the light source generates the optical pulse at a speed that is M times higher than an optical pulse measurement speed of each of the multiple receivers.

9. The quantum key distribution apparatus of claim 8, further comprising:
an encoder that encodes private key information in the optical pulse generated by the light source; and
M switches configured to that selectively turn on/off the M communication paths,
wherein each of the M switches is connected between the optical splitter and a corresponding one of the M wavelength division multiplexing units.

10. The quantum key distribution apparatus of claim 9, wherein the encoder encodes different pieces of private key information for respective wavelengths of the optical pulse.

11. The quantum key distribution apparatus of claim 8, wherein each of the switches is turned on at intervals of a period corresponding to an optical pulse measurement speed of each of the multiple receivers.

* * * * *